United States Patent
Comninellis et al.

(10) Patent No.: US 11,598,323 B2
(45) Date of Patent: Mar. 7, 2023

(54) METHOD FOR PUMPING AN AQUEOUS FLUID THROUGH AN ELECTROOSMOTIC MEMBRANE

(71) Applicant: Osmotex AG, Thalwil (CH)

(72) Inventors: Christos Comninellis, Thalwil (CH); Stephanie Say-Liang-Fat, Thalwil (CH); Trond Heldal, Thalwil (CH)

(73) Assignee: OSMOTEX AG, Thalwil (CH)

( * ) Notice: Subject to any disclaimer, the term of this patent is extended or adjusted under 35 U.S.C. 154(b) by 231 days.

(21) Appl. No.: 16/646,449

(22) PCT Filed: Sep. 12, 2018

(86) PCT No.: PCT/EP2018/074614
§ 371 (c)(1),
(2) Date: Mar. 11, 2020

(87) PCT Pub. No.: WO2019/053064
PCT Pub. Date: Mar. 21, 2019

(65) Prior Publication Data
US 2020/0271111 A1 Aug. 27, 2020

(30) Foreign Application Priority Data
Sep. 12, 2017 (GB) ..................... 1714645

(51) Int. Cl.
*F04B 19/06* (2006.01)
*F04B 17/03* (2006.01)
(Continued)

(52) U.S. Cl.
CPC ............ *F04B 17/03* (2013.01); *B01D 61/427* (2013.01); *B01D 61/56* (2013.01); *F04B 19/06* (2013.01);
(Continued)

(58) Field of Classification Search
CPC .... B01D 61/427; B01D 61/56; B01D 61/445; B01D 61/345; F04B 17/03; F04B 19/06; F04B 19/006
See application file for complete search history.

(56) References Cited

U.S. PATENT DOCUMENTS 3,227,662 A  1/1966  Kollsman
5,938,822 A  8/1999  Chen et al.
(Continued)

FOREIGN PATENT DOCUMENTS

JP    2006-128039 A     5/2006
WO    WO 02/103210 A1   12/2002
(Continued)

OTHER PUBLICATIONS

Seawater usable for production and consumption of hydrogen peroxide as a solar fuel, by Mase (Year: 2016).*
(Continued)

*Primary Examiner* — Thomas Fink
(74) *Attorney, Agent, or Firm* — Lippes Mathias LLP

(57) ABSTRACT

A method of pumping an aqueous fluid through an electroosmotic membrane situated between a cathode and an anode includes oxidizing water to $O_2$ at the anode and reducing $O_2$ at the cathode. A potential difference E between the cathode and the anode is 1.4 V or less.

20 Claims, 4 Drawing Sheets

Figure 1:
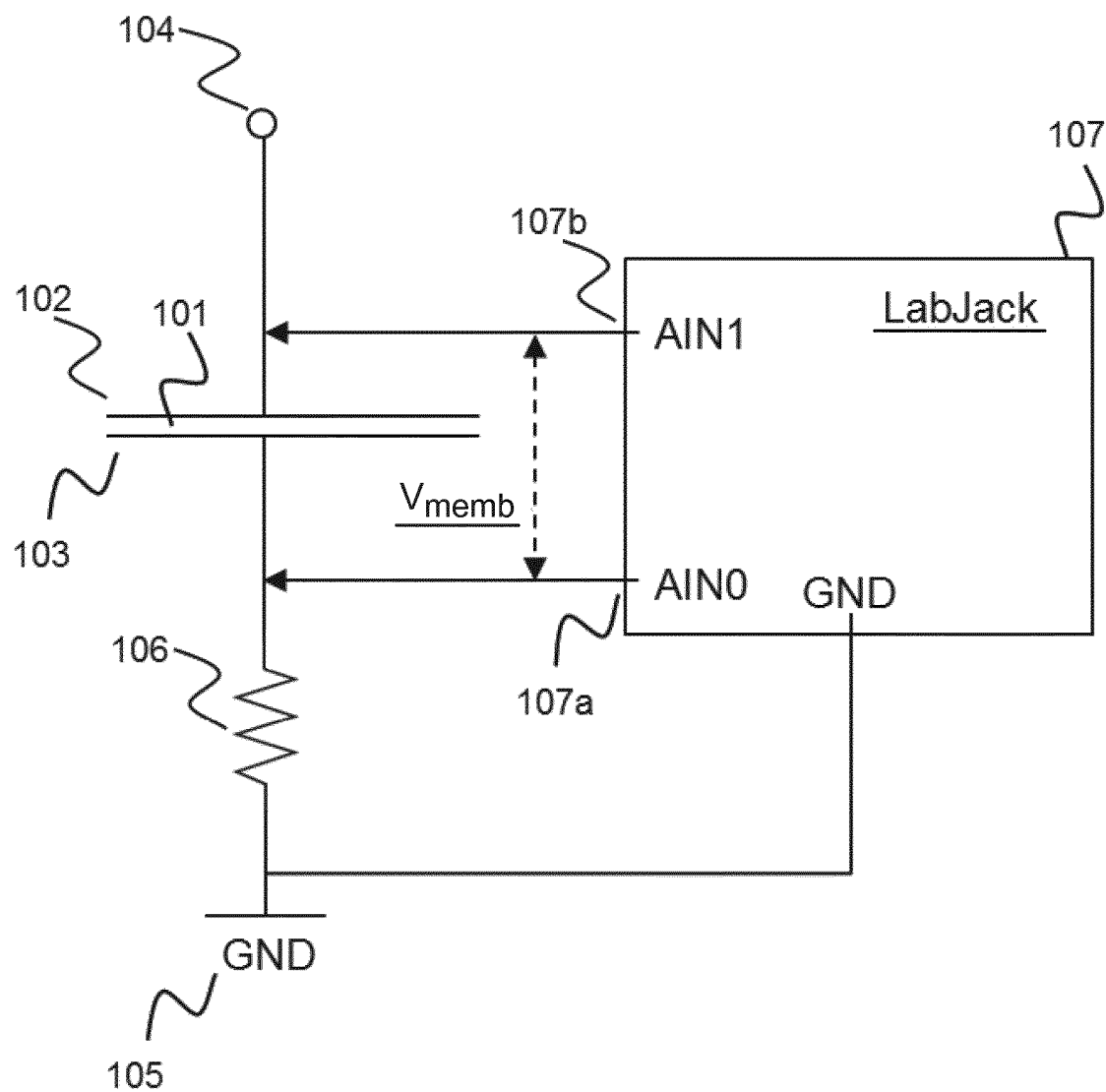

(51) Int. Cl.
*B01D 61/42* (2006.01)
*B01D 61/56* (2006.01)
*A41D 31/12* (2019.01)

(52) U.S. Cl.
CPC ...... *A41D 31/125* (2019.02); *B01D 2313/345* (2013.01)

(56) References Cited

U.S. PATENT DOCUMENTS

| | | | |
|---|---|---|---|
| 6,514,561 | B1* | 2/2003 | Mallant ............... C08J 5/225 427/372.2 |
| 8,252,250 | B2* | 8/2012 | Posner ............... F04B 19/00 422/50 |
| 2005/0034842 | A1* | 2/2005 | Huber ............... F04B 19/006 165/80.4 |
| 2005/0254967 | A1* | 11/2005 | Mosier ............... F04B 19/006 417/50 |
| 2006/0108286 | A1 | 5/2006 | Hambitzer et al. |
| 2006/0275138 | A1 | 12/2006 | Sheng et al. |
| 2010/0294652 | A1 | 11/2010 | Sugioka |
| 2012/0285881 | A1 | 11/2012 | Jikihara et al. |
| 2014/0088506 | A1 | 3/2014 | Heller et al. |
| 2015/0034486 | A1 | 2/2015 | Sugioka |
| 2016/0025083 | A1 | 1/2016 | Shin |
| 2016/0252082 | A1* | 9/2016 | Okumura ............ F04B 19/006 417/48 |

FOREIGN PATENT DOCUMENTS

| | | |
|---|---|---|
| WO | WO 2004/007045 A1 | 1/2004 |
| WO | WO 2004/036041 A2 | 4/2004 |
| WO | WO 2005/113419 A2 | 12/2005 |
| WO | WO 2006/128039 A2 | 11/2006 |
| WO | WO 2009/098486 A1 | 8/2009 |
| WO | WO 2011/112723 A2 | 9/2011 |
| WO | WO 2013/087804 A1 | 6/2013 |
| WO | WO 2015/173359 A1 | 11/2015 |

OTHER PUBLICATIONS

Pumping Effects in Water Movement Accompanying Cation Transport Across NAFION-117 Membranes, by Xie (Year: 1996).*
An Alternating Current Electroosmotic Pump Based on Conical Nanopore Membranes, by Wu (Year: 2016).*
A minature, single use, skin-adhered, low voltage, electroosmotic pumping-based subcutaneous infusion system, by Shin (Year: 2011).*
A miniature, nongassing electroosmotic pump operating at 0.5 V, by Shin, (Year: 2010).*
Electroosmotically Induced Hydraulic Pumping with Integral Electrodes on Microfluidic Devices, by McKnight (Year: 2001).*
International Search Report and Written Opinion of International Application No. PCT/EP2018/074614 dated Dec. 10, 2018, 12 pages.
UK Intellectual Property Office Search Report of British Application No. 1714645.7 dated Feb. 9, 2018, 7 pages.

* cited by examiner

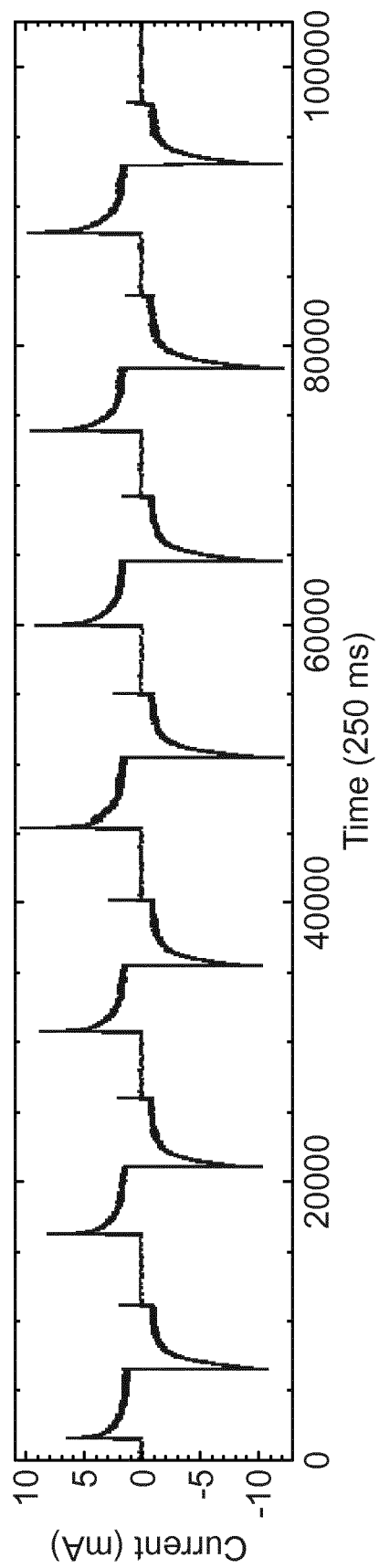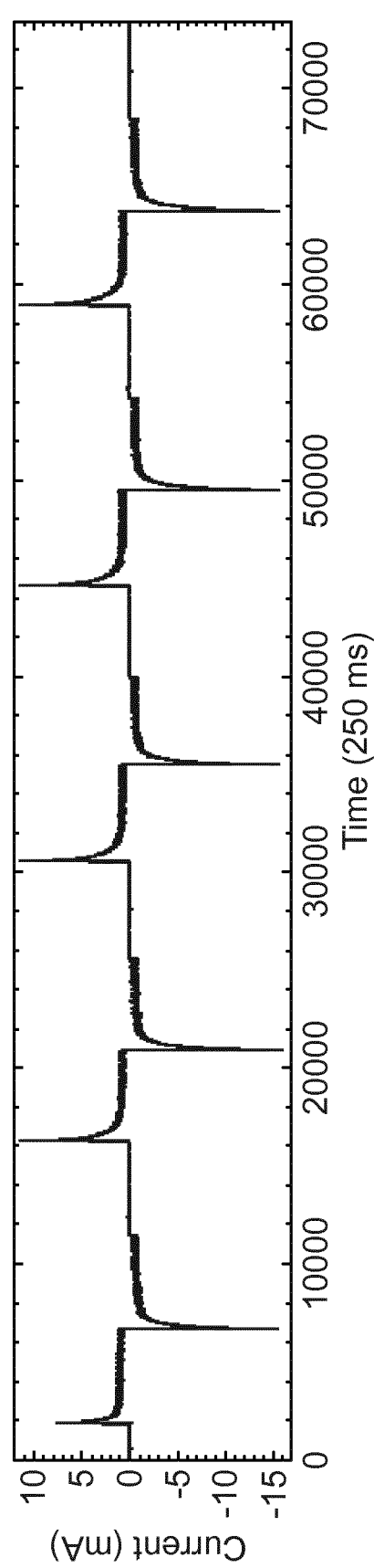

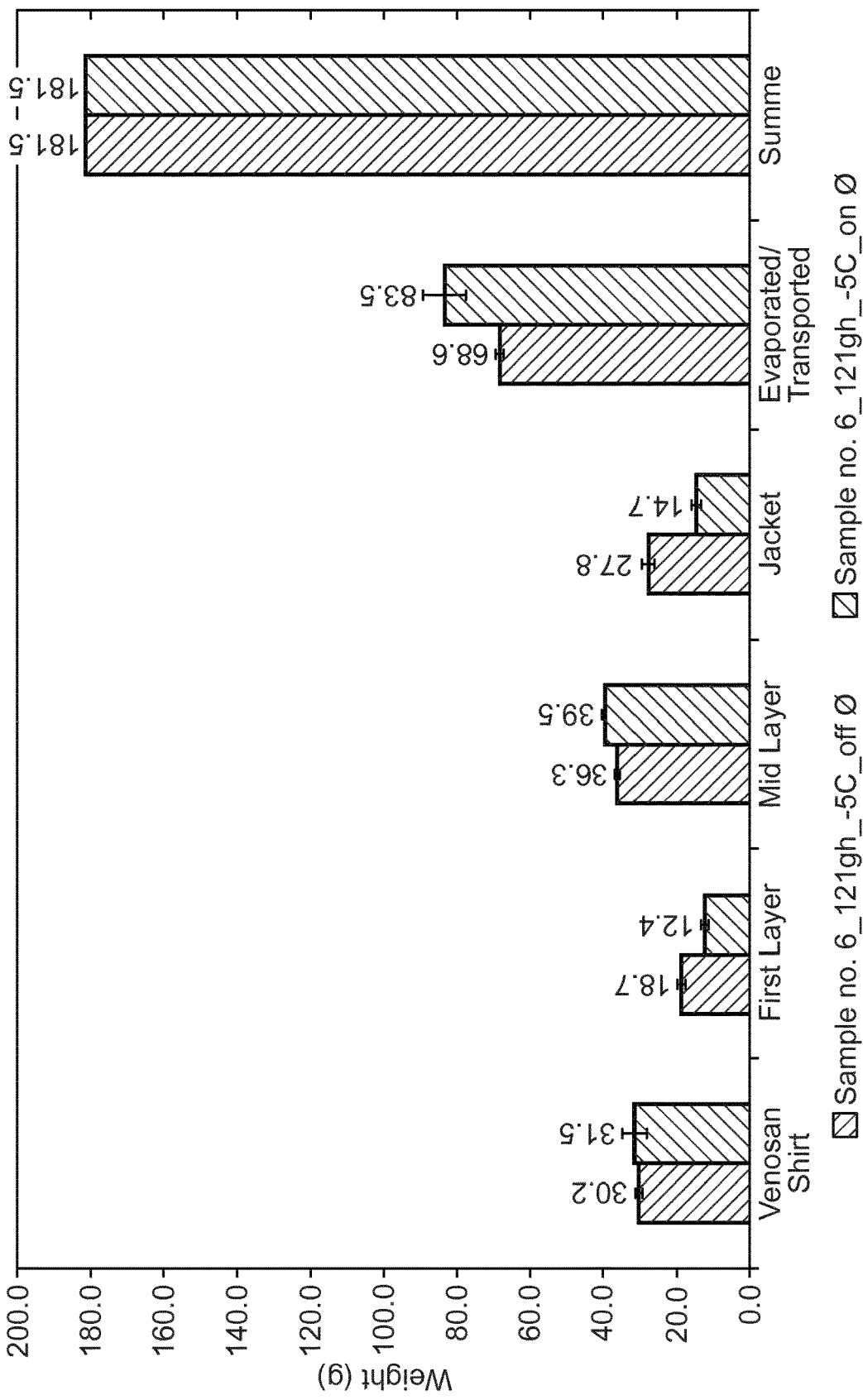

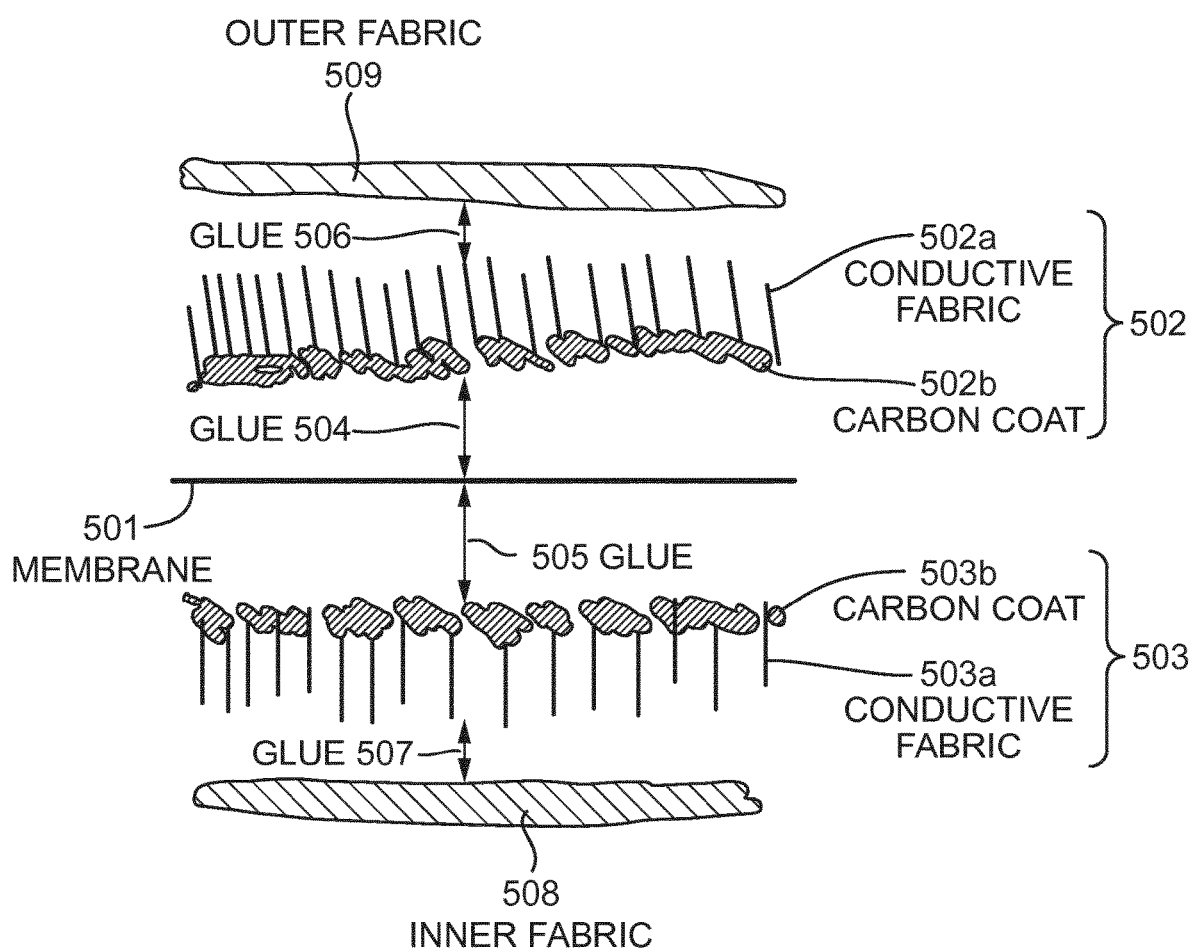

METHOD FOR PUMPING AN AQUEOUS FLUID THROUGH AN ELECTROOSMOTIC MEMBRANE

FIELD OF THE INVENTION

The present invention relates to methods of pumping an aqueous fluid through a porous material by means of electroosmotic pumping.

BACKGROUND

Electroosmosis is a well-known technique for transporting fluids through membranes. A porous material (a membrane) is sandwiched between two conductive porous electrodes (an anode and a cathode) that are connected to a suitable energy source. Application of a potential difference across the electrodes creates an electric field between them and hence an electric field gradient is created across the membrane. Most surfaces possess a charge due to surface ionisation. This creates an electric double layer (EDL): when a fluid containing ionic species is placed in contact with the surface, a first layer of ions having a charge opposing the surface charge adsorbs to the surface. In turn, this first ionic layer promotes the formation of a diffuse second layer which is a region of solvent having an increased concentration of ions which are opposite in charge to the ions in the first layer. When an electric field is applied across the surface, the electric field gradient induces motion of the ions in the diffuse layer due to the Coulomb force. The ions in the diffuse layer are attracted towards the oppositely charged electrode. The motion of the ions causes the surrounding medium to move with them due to viscous forces. This causes the fluid to move through the membrane, effectively pumping the fluid from one side of the membrane to the other.

The rate and extent of transport of the fluid can be controlled by appropriate selection of the applied voltage and/or the current which is passed. Electroosmotic pumps exploit these phenomena to control the movement of fluids, and have become a familiar tool in microfluidics applications, capillary electrophoresis, and other laboratory analytical techniques. Microfluidic structures, or microsystems, consist of a series of microchannels and reservoirs, at least one dimension of which is generally in the micro- or nanometer range and usually not greater than 1-2 mm. Fluids can be directed through these microchannels and subjected to a variety of actions such as mixing, screening, detection, separation, reaction etc. Such microstructures are of growing importance in chemical and biotechnical fields as they allow tests and analysis to be carried out on a very small scale, thus reducing the amount of sample and reagents consumed in each operation. This means work can be carried out quickly and at less expense than previously, with the production of fewer waste materials. Such microsystems are often referred to as "lab-on-a-chip", or Micro-Total-Analysis Systems (μTAS). The use of microfluidic pumps which utilise electro-osmosis is considered a promising technology for many microsystem applications, as these pumps are relatively simple to fabricate and a good performance can be obtained for a wide range of ionic concentrations.

A common method of generating electroosmotic flow is to electrolyse water. Water is oxidized at an anode to produce $O_2$ and reduced at a cathode to produce $H_2$:

Anodic reaction: $2H_2O \rightarrow O_2 + 4H^+ + 4e^-$
Cathodic reaction: $4H^+ + 4e^- \rightarrow 2H_2$
Overall reaction: $2H_2O \rightarrow 2H_2 + O_2$.

If an electroosmotic membrane is located between the anode and the cathode which allows transport of $H^+$ through the membrane, the potential difference applied to the electrodes to cause electrolysis will also create electroosmotic flow of water through the membrane. Platinum electrodes, or other noble metal electrodes, are typically employed for these reactions. The $O_2$ and $H_2$ are generated in gaseous form at the electrodes.

This commonly-used method has a number of drawbacks. $O_2$ and $H_2$ gas can become trapped in the pores of the membrane. This blocks the pores and impedes transport of the fluid through the membrane, dramatically decreasing the electroosmotic flow. $H_2$, which is approximately 26 times less soluble in water than $O_2$, is particularly problematic in this respect. It has previously been proposed to address this problem by using certain electrode metals, such as palladium, which absorb hydrogen. However, after a period of operation the electrode becomes saturated with hydrogen, and then hydrogen gas starts to form. Also, the electrode can become damaged by holding a concentration of hydrogen which is too high, causing the metal lattice to expand irreversibly. For a typical electroosmotic pump, saturation of such electrodes and bubble formation begins to take place after several hours of operation, limiting the useful lifetime of the pump. In any electroosmotic system employing water electrolysis there is also a risk of explosion due to reactions between $H_2$ and $O_2$. High electrode potentials are also required: the standard potential for the electrolysis of water is −1.23 V and therefore an electrode potential of 1.23 V or greater is required; with the inert electrodes commonly used, a large overpotential is needed and therefore voltages of about 2 V or greater are commonly employed. With such large voltages there is a risk of undesirable, and potentially dangerous, side-reactions such as the generation of ozone or chlorine gas (e.g. from NaCl dissolved in the water).

To overcome these drawbacks, another alternative system has recently been proposed which uses the $Ag_2O/Ag$ redox couple at both cathode and anode. In this system Ag is oxidized at the anode surface to produce $Ag_2O$ as a solid. $Ag_2O$ is reduced at the cathode surface to produce solid silver.

Anodic reaction: $2Ag + H_2O \rightarrow Ag_2O + 2H^+ + 2e^-$

Cathodic reaction: $Ag_2O + 2H^+ + 2e^- \rightarrow 2Ag + H_2O$

Thus, an electrical potential is maintained across the membrane, enabling electroosmotic pumping, but electrolysis of water is avoided. Such systems are disclosed, for example, in J. Am. Chem. Soc, 2011, vol. 133, pp. 2374-2377.

Although the $Ag_2O/Ag$ system avoids the problems associated with water electrolysis, it still suffers from drawbacks. The volume of fluid that can be moved by the electroosmotic pump is limited by the amount of active electrode material (Ag and $Ag_2O$) which is present at the electrodes and which is consumed during the reaction. The system can be regenerated only if the polarity of the electrodes is reversed, thereby reversing the electrochemical reactions. However, reversing the polarity of the electrodes causes the direction of electroosmotic flow to be reversed. This decreases the net flow across the membrane and under typical conditions the net fluid flow is almost zero. Moreover, silver can undergo reactions with species in the fluid, leading to irreversible erosion of the electrode materials.

There is therefore a need for an electroosmotic system which enables the efficient transport of fluids without the problems associated with the electrolysis of water and which also avoids the drawbacks of the silver/silver oxide redox couple described above.

The present inventors have now found that the methods described herein are capable of generating electroosmotic flow without the disadvantageous effects of methods based on water electrolysis or the silver/silver oxide redox couple.

DESCRIPTION OF THE INVENTION

Instead of water electrolysis or the $Ag/Ag_2O$ redox couple, the present invention instead exploits the oxidation of water to form oxygen, and the reduction of oxygen either to re-form water or to form hydrogen peroxide. This maintains an advantageous aspect of the conventional water-electrolysis-based electroosmotic pumping methods, in that the fluid to be transported across the membrane is itself employed in the redox reactions which are necessary to generate electroosmotic flow. This is preferable to alternative redox setups such as the $Ag/Ag_2O$ methods described above, as such setups require specialised redox-active electrodes and also suffer from low or zero net flow due to the requirement for current and voltage reversals to regenerate the redox-active electrode species. However, the methods of the present invention improve on the conventional water-electrolysis-based approach by avoiding electrolysis and therefore avoiding the disadvantageous and potentially dangerous generation of hydrogen gas.

The present invention therefore provides a method of pumping an aqueous fluid through an electroosmotic membrane situated between a cathode and an anode, the method comprising oxidising water to $O_2$ at the anode and reducing $O_2$ at the cathode; wherein the potential difference between the cathode and the anode is 1.4 V or less.

The electrode potential of the electrolysis of water is −1.23 V, as described above. In practice it is found that potential differences of up to 1.4 V may be employed without appreciable levels of hydrolysis taking place. However, in order to avoid any risk of hydrolysis occurring, it is preferable to work at lower potential differences. In some embodiments of the invention the potential difference between the cathode and the anode is 1.3 V or less. In particularly preferred embodiments of the invention the potential difference is less than 1.23 V, i.e. less than the thermodynamic electrode potential for water electrolysis.

By "aqueous fluid" is meant a liquid or gel comprising water in an amount sufficient to generate electroosmotic flow when subjected to the electrochemical processes described herein. The aqueous fluid may be an aqueous solution or may comprise a mixture of water and at least one non-aqueous liquid component. Typically, the aqueous fluid will comprise at least 50% water by volume, preferably at least 60%, at least 70%, at least 80% or at least 90%.

Oxidation of water at the anode results in the formation of oxygen gas (i.e. the electrogeneration of oxygen):

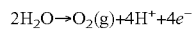
$2H_2O \rightarrow O_2(g)+4H^++4e^-$

The gaseous $O_2$ generated at the anode then dissolves in the bulk water, resulting in an increase in the concentration of $O_2$ in the water to approximately 40 mg/L (compared to an initial concentration of approximately 8 mg/L when water is in equilibrium with air).

Reduction of oxygen at the cathode may result in formation of water:

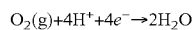
$O_2(g)+4H^++4e^- \rightarrow 2H_2O$

This half-cell reaction has a standard electrochemical potential ($E^o$) of 0.81 V relative to the standard hydrogen electrode (SHE).

Alternatively, oxygen may be reduced at the cathode to form hydrogen peroxide:

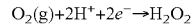
$O_2(g)+2H^++2e^- \rightarrow H_2O_2$

This half-cell reaction has an $E^o$ of 0.29 V relative to SHE.

The reduction of oxygen to hydrogen peroxide is a 2-electron reduction whereas its reduction to $H_2O$ is a 4-electron reaction. In the case where water is oxidised to $O_2$ at the anode (a 4-electron oxidation) and $O_2$ is reduced to hydrogen peroxide at the cathode (a 2-electron oxidation) the overall reaction system balances itself by consumption of oxygen which is already dissolved in the water as part of the normal 8 mg/L present due to equilibrium with the air.

As the methods of the invention electrogenerate $O_2$, they may in principle be performed even in deoxygenated water and/or in systems in which the fluid is not able to equilibrate with atmospheric oxygen (e.g. in sealed systems or under an inert atmosphere). In this case the oxygen which is reduced at the cathode will be the same oxygen which was electrogenerated at the anode. However, such systems would give a lower current density and hence slower electroosmotic pumping. It is therefore preferable that the aqueous fluid is not deoxygenated.

Due to the $E^o$ values for the two possible $O_2$ reduction half-reactions, the overall standard cell potential is lower than the thermodynamic cell potential required for water electrolysis, which is 1.23 V. For the case where water is oxidised to oxygen and oxygen is reduced to hydrogen peroxide, the overall thermodynamic cell potential is 0.52 V. For the case where water is oxidised to oxygen and oxygen is reduced to water, the overall thermodynamic cell potential is zero (0 V).

The thermodynamic cell potentials of these reactions therefore allow the methods of the present invention to be performed at potential differences below 1.23 V and therefore without causing water electrolysis. Application of the potential difference causes electroosmotic flow of the fluid through the membrane. This is in line with the general principles underpinning all electroosmotic techniques. In common with water electrolysis-based methods of electroosmosis, the methods of the invention employ the medium that is to be pumped (i.e. the aqueous fluid) as the subject of the electrochemical reactions which are used to generate the electroosmotic current. However, uniquely to the methods of the present invention, a potential difference below 1.23 V (i.e. a potential difference which is too low for water electrolysis to occur) can be used, without requiring the use of redox-active electrodes such as $Ag/Ag_2O$ electrodes as intermediates. The methods of the present invention therefore avoid many of the problems associated with water electrolysis as they are operated at a lower voltage and do not generate hydrogen.

The applied cell potential (i.e. the potential difference between the anode and cathode) should be selected according to the cathodic reaction which is desired, i.e. the potential should be chosen as appropriate to achieve reduction of $O_2$ to $H_2O_2$ or to achieve reduction of $O_2$ to $H_2O$ as required. In order to achieve reduction of $O_2$ to $H_2O_2$ the potential difference should be at least 0.52 V, i.e. the potential difference should be greater than or equal to 0.52 V (with the proviso that it remains no greater than 1.4 V, and preferably below 1.23 V, in order to avoid water electrolysis, i.e. the potential difference E is in the range 0.52 V≤E≤1.4 V, preferably 0.52 V≤E<1.23 V). Where reduction of $O_2$ to H₂O is required, the overall thermodynamic cell potential for the reaction is zero, but application of a potential difference of 0 V will clearly not achieve any electrochemical reactions. A small positive potential difference is therefore required and so the potential difference should be greater than zero. Overall this therefore means that, in order to achieve reduction of $O_2$ to $H_2O$, the potential difference should be between 0 and 1.4 V, preferably between 0 and 1.23 V, i.e. the potential difference E is in the range $0\ V < E \leq 1.4\ V$, preferably $0\ V < E < 1.23\ V$.

As is common in electrochemical applications, an overpotential will typically be employed such that the applied potential difference is slightly greater than the theoretical thermodynamic potential difference. The overpotential compensates for any energetic losses within the cell (typically wherein energy is lost as heat, reducing the effective potential difference). The precise magnitude of overpotential which is employed will depend on factors such as the electrode materials, the surface area of the electrodes, pH and pH gradients, IR drop, and the working current density employed. The selection of suitable overpotentials in any given set of circumstances will be within the ordinary capabilities of the skilled person. However, typical overpotentials suitable for the methods of the present invention may be approximately 0.1 V to 0.4 V, and preferably 0.2±0.1 V. In practice, the potential difference E employed in certain embodiments of the methods of the invention may be in the range $0.1\ V \leq E \leq 1.4\ V$, preferably $0.1\ V \leq E < 1.23\ V$, and particularly preferably $0.2\ V \leq E < 1.23\ V$, $0.3\ V \leq E < 1.23\ V$ or $0.4\ V \leq E < 1.23\ V$.

In the potential difference range $0.52\ V \leq E \leq 1.4\ V$ (e.g. $0.52\ V \leq E < 1.23\ V$) it is theoretically possible to achieve reduction of $O_2$ to both $H_2O$ and $H_2O_2$, as a result of competing reaction pathways. While this is not particularly problematic, in some circumstances it may be desirable to reduce $O_2$ to $H_2O$ only, i.e. to avoid reduction to $H_2O_2$. This may be achieved by ensuring that the potential difference is below 0.52 V and therefore in certain embodiments of the invention the potential difference E is in the range $0\ V < E < 0.52\ V$. The present inventors have surprisingly found that it is possible to achieve electroosmotic transport across the membrane even at very low overpotentials and therefore if an overpotential is applied this means that in certain embodiments the potential difference E is therefore in the range $0.01\ V \leq E < 0.52\ V$, $0.02\ V \leq E < 0.52\ V$, $0.03\ V \leq E < 0.52\ V$, $0.04\ V \leq E < 0.52\ V$ or $0.05\ V \leq E < 0.52\ V$, preferably $0.1\ V \leq E < 0.52\ V$, $0.2\ V \leq E < 0.52\ V$, $0.3\ V \leq E < 0.52\ V$ or $0.4\ V \leq E < 0.52\ V$, and particularly preferably $0.1\ V \leq E \leq 0.4\ V$, e.g. $0.1\ V \leq E \leq 0.3\ V$ (i.e. $E = 0.2 \pm 0.1\ V$). Such potential difference ranges are of particular interest for use in combination with carbon electrodes as discussed below.

Where reduction of $O_2$ to $H_2O_2$ at the cathode is desired (a reaction which has a thermodynamic cell potential of 0.52 V as discussed above), the potential difference may be about 0.6 V or greater if an overpotential is applied. In certain embodiments, the potential difference E is therefore in the range $0.6\ V \leq E \leq 1.4\ V$ and preferably $0.6\ V \leq E < 1.23\ V$, $0.7\ V \leq E < 1.23\ V$, $0.8\ V \leq E < 1.23\ V$, or $0.9\ V \leq E < 1.23\ V$, preferably $0.6\ V \leq E \leq 1.0\ V$, $0.6\ V \leq E \leq 0.9\ V$, and particularly preferably $0.6\ V \leq E \leq 0.8\ V$ (i.e. $E = 0.7 \pm 0.1\ V$) or $0.62\ V \leq E \leq 0.82\ V$ (i.e. $E = 0.72 \pm 0.1\ V$).

Typically, in electroosmotic applications a working current density of $<1\ mA/cm^2$ may be employed although working current densities up to about $3\ mA/cm^2$ have been observed in some embodiments of the invention. Such working current densities may be employed with any of the electrode potentials or overpotentials described above. Thus, in further embodiments of the invention, methods employing all possible combinations of potential difference ranges disclosed explicitly or implicitly herein together with a working current density of up to $3.5\ mA/cm^2$, preferably up to $3\ mA/cm^2$, up to $2\ mA/cm^2$ or up to $1\ mA/cm^2$ are contemplated. Typically a working current density in any of the embodiments of the invention described herein may be $<1\ mA/cm^2$, such as $\leq 0.5\ mA/cm^2$.

The potential difference may be applied as a direct current (DC) voltage, i.e. such that the polarity of the potential difference remains unchanged and the current flow direction is constant. The DC voltage may be interrupted, such that after being applied for a first time period the potential difference is then reduced to 0 V for a second time period before being restored to a nonzero magnitude for a third time period. The potential difference may be of the same or different magnitudes during the first and third time periods. The restored potential difference will have the same polarity as the initial potential difference. The first, second and third time periods may each independently have a typical duration of 1 second to 30 minutes, 1 second to 20 minutes, 1 second to 10 minutes, 1 second to 5 minutes, or 1 to 200 seconds, such as 10 to 50 seconds. Thus the first, second and third time periods may be the same as one another or different to one another in duration. Preferably the second time period is different in duration to the first and third time periods. Preferably the first and third time periods are the same in duration as one another and the second time period is different in duration. The cycle of first, second and third time periods may be repeated as often as desired and the duration of such time periods and the magnitude of non-zero potential difference may vary independently during any such repetitions. The use of interrupted DC voltage may be advantageous to assist the dissolution of electrogenerated $O_2$, particularly when operating at high current densities where the rate of $O_2$ generation via oxidation of water may exceed the rate of $O_2$ dissolution. Interrupted DC voltage therefore assists in avoiding the formation of undesirable gas bubbles by temporarily halting the production of $O_2$ so that dissolution of the already-generated $O_2$ may take place.

Alternatively, the potential difference may be applied as an alternating current (AC) voltage, i.e. such that the potential difference reverses polarity periodically. In such embodiments the current flow direction (and hence the direction of electroosmotic flow) will reverse when the potential difference reverses in polarity. Thus during a first time period the potential difference is applied with a first polarity and during a second time period the potential difference is applied with a second polarity which is opposite to the first polarity. The effect of this reversal is that $O_2$ will form at the electrode which is initially the anode, creating a higher concentration of $O_2$ in its vicinity. When the polarity reverses, the $O_2$ is reduced to $H_2O_2$ at the same electrode, which is now the cathode. This cycle is repeated as often as the polarity is alternated. The sequence of first and second polarities may be repeated as often as desired. Preferably the potential difference has the same magnitude, but opposite polarity, during the first and second time periods; however, in certain embodiments of the invention both the magnitude and polarity of the potential difference may differ in the first time period compared to the second time period. As with the interrupted DC embodiment described above, each of the first and second time periods during an AC potential difference cycle may independently have typical time periods of 1 second to 30 minutes, 1 second to 20 minutes, 1 second to 10 minutes, 1 second to 5 minutes, or 1 to 200 seconds, such as 10 to 50 or 20 to 40 seconds. The AC potential difference may have a frequency of 0.0025 Hz to 1 Hz, preferably 0.005 Hz to 0.5 Hz, 0.01 Hz to 0.05 Hz, or 0.02 Hz to 0.1 Hz. In some embodiments the AC voltage may be interrupted. For example there may be an "off" period between the first and second time periods or there may be an "off" period after the second time period. During the "off" period the potential difference is zero. Preferably the "off" period is placed after the second time period, i.e. in between the application of a voltage of a second polarity and before the restoration of the first polarity. The "off" period may be anywhere from 1 to 4000 seconds in duration, for example 1 second to 30 minutes, 1 second to 20 minutes, 1 second to 10 minutes, 1 second to 5 minutes, 5 seconds to 1 hour, 10 seconds to 30 minutes, or 20 seconds to 20 minutes. The cycle of first and second time periods, and optional "off" periods, may be repeated as often as desired with the duration of any such periods, and the magnitude of any voltages applied during such periods, being variable independently of one another.

Typically, the voltage will be maintained at a constant value during any individual period of application (e.g. during a period of application in the case of interrupted DC voltage or AC voltage). The current during such periods of constant voltage may vary. However, in certain embodiments of the invention the potential difference may be applied galvanostatically, i.e. by maintaining a constant current and allowing the voltage to vary as required to maintain that current. Optionally, during galvanostatic operation, the voltage may be allowed to vary within certain bounds and/or to remain at or below a maximum voltage. In such embodiments the same voltage considerations will apply as discussed elsewhere herein, i.e. the voltage may be allowed to vary during any individual period of application but with the proviso that it does not exceed 1.4 V and preferably is <1.23 V. In certain embodiments the potential difference may switch from galvanostatic to potentiostatic application if a predetermined maximum voltage (such as 1.4 V or 1.23 V) is reached. All preferred voltage ranges and sub-ranges discussed elsewhere herein (for example, in connection with the reduction of $O_2$ to $H_2O$ or $H_2O_2$) self-evidently also apply in relation to galvanostatic operation. Galvanostatic operation allows the possibility to estimate the amount of water which has been transported through the membrane based on the electrical charge which has passed.

In certain embodiments of the invention the potential difference may be applied potentiostatically (also called "charge counting" mode), in which the voltage (magnitude or bias) or length of voltage pulses is automatically adjusted to assure equal charge transfer in both directions. Such modes of operation are particularly preferred when asymmetric electroosmotic membranes are employed as described in further detail elsewhere herein. In general it is safer to work under potentiostatic conditions as this allows undesired side-reactions to be avoided. If the cell potential is below 1.23 V (the thermodynamic potential of water decomposition), electrolysis of water to $O_2$ and $H_2$ can be avoided, which is not always possible under galvanostatic conditions.

Any suitable electrode material may be employed as anode or cathode and the skilled person will be able to select appropriate materials. The desired reduction product may in some circumstances influence the choice of cathode material, because the material of the cathode can influence the reactions which take place at its surface. Consequently, if reduction of oxygen to $H_2O$ is required it is important to ensure that the cathode material is appropriate to this reaction. Similarly, if reduction of oxygen to $H_2O_2$ is required it is important to ensure that the cathode material is appropriate to this reaction. Carbon electrodes, and particularly activated carbon electrodes, are appropriate for both types of reduction reactions (i.e. $O_2/H_2O$ and $O_2/H_2O_2$ reductions) which are described herein. Surprisingly, the present inventors have found that carbon electrodes may be employed as the cathode even at low voltages in the range $0$ V<E<0.52 V as described above, and particularly at very low overpotentials such as 0.1 V≤E<0.52 V, preferably 0.2 V≤E<0.52 V, 0.3 V≤E<0.52 V or 0.4 V≤E<0.52 V, and particularly preferably 0.1 V≤E≤0.4 V, e.g. 0.1 V≤E≤0.3 V (i.e. E=0.2±0.1 V). In such cases reduction of $O_2$ to $H_2O$ occurs at the cathode, which is surprising because it had previously been thought that a voltage of at least 0.55 V was required to generate electroosmotic transport with carbon cathodes even though the thermodynamic electrode potential for the reduction of oxygen to $H_2O$ is zero. The use of carbon electrodes at low electrode potentials in this manner is particularly advantageous as it allows the use of expensive Pt electrodes to be avoided and also reduces the energy requirements of the reaction.

The anode and cathode may be of the same material or may be of different materials.

In certain embodiments of the invention the anode may be a carbon electrode (e.g. a glassy carbon, graphite (e.g. pyrolytic graphite), activated carbon, carbon nanotube coated glassy carbon, heteroatom-doped carbon, oxidised glassy carbon, or oxidised graphite electrode). The carbon electrode may be a polyHIPE (polymerized high internal phase emulsion)-based carbon as described in *ACS Catal.*, 2016, 6 (8), pp 5618-5628, the entire contents of which are incorporated herein by reference, which has a very high volume of ultramicropores and a high degree of defects on the surface, which lead to good performance in reduction of $O_2$ and also display high electrochemical stability and high kinetic current density. The carbon electrode may be a hematite($\alpha$-$Fe_2O_3$)-nanoparticle-modified glassy carbon electrode, for example as described in Shimizu et al., *Chemical Science* 2016, issue 5, the entire contents of which are incorporated herein by reference. Such electrodes have been found to promote the disproportionation of $H_2O_2$ into $O_2$ and $H_2O$ and thereby lead to a dramatic improvement in efficiency compared to standard glassy carbon electrodes (which catalyse the reduction of $O_2$ to $H_2O_2$ but do not catalyse the further disproportionation of $H_2O_2$). Further carbon electrode materials which may be employed include Carbon Black (CB), multi-walled carbon nanotubes (MWCNT), Graphene Oxide (GO) and reduced graphene oxide (rGO). The performance of such electrodes is compared in RSC Adv., 2016, 6, 94669-94681, the entire contents of which are incorporated herein by reference. The use of a Pt-doped CB material has been found to promote 4-electron reduction of $O_2$ and therefore in some embodiments the carbon electrode may comprise CB doped with Pt.

In certain embodiments of the invention the anode may be a metal electrode (e.g. an electrode comprising, consisting essentially of, or consisting of a noble metal such as platinum, palladium, nickel, ruthenium, rhodium, osmium, iridium, gold, copper, or rhenium or alloys of such metals).

In certain embodiments of the invention the cathode may be a carbon electrode (e.g. a glassy carbon, graphite (e.g. pyrolytic graphite), activated carbon, carbon nanotube coated glassy carbon, heteroatom-doped carbon, oxidised glassy carbon, or oxidised graphite electrode).

In certain embodiments of the invention the cathode may be a metal electrode (e.g. an electrode comprising, consisting essentially of, or consisting of a noble metal such as platinum, palladium, nickel, ruthenium, rhodium, osmium, iridium, gold, copper, or rhenium or alloys of such metals).

In order to reduce $O_2$ to $H_2O$ it is preferable to use a catalytic metal electrode such as a noble metal electrode (e.g. platinum, palladium, ruthenium, rhodium, osmium, iridium, gold, copper, or rhenium, or alloys of such metals). By "catalytic" is meant a material which is catalytic towards the reduction of $O_2$ to $H_2O$. Platinum or platinum alloys are particularly preferred for this purpose. Other suitable cathode materials for this purpose include iron-macrocyclic complexes, dinuclear cobalt macrocyclic complexes, transition metal carbides and chalcogenides. Preferred chalcogenides are those of formula $Mo_6MX_8$ (where M denotes a transition metal and X is a chalcogen), particularly preferably those in which M is Ru or Re and X is Se.

In order to reduce $O_2$ to $H_2O_2$ any of the cathode materials mentioned above may be employed. However, it is preferable to employ a carbon electrode or a mononuclear cobalt macrocyclic complex. Carbon electrodes may also result in the formation of a small amount of $H_2O$ and therefore if it is desired to prevent $H_2O$ from forming, the potential difference should be chosen appropriately as described above, i.e. a potential difference at which reduction to $H_2O_2$ can take place but not reduction to $H_2O$. Similarly, if employing a catalytic metal electrode or a chalcogenide, which are also suitable for forming $H_2O$, it may be preferable to apply a potential difference at which reduction to $H_2O_2$ can take place but not reduction to $H_2O$, in order to ensure that only $H_2O_2$ is produced. Preferably the material employed should be non-catalytic, i.e. it does not catalyse the reduction of $O_2$ to $H_2O$. For these purposes carbon electrodes are classed as "non-catalytic" even though they may result in the formation of a small amount of $H_2O$ under some circumstances. Non-catalytic cathode materials are thus those materials which, when operated in the range $0 \leq E \leq 1.4$ V, do not exclusively reduce $O_2$ to $H_2O$. Non-catalytic cathode materials are thus materials which permit reduction of $O_2$ to $H_2O_2$.

In some embodiments of the invention the anode and cathode are both carbon electrodes and the potential difference E is in the range $0.52 \leq E \leq 1.4$ V, preferably $0.52 \leq E < 1.23$ V. In such embodiments, the reduction product may typically be $H_2O_2$.

In some embodiments of the invention the anode and cathode are both carbon electrodes and the potential difference E is $0.72 \pm 0.1$ V. In such embodiments, the reduction product may typically be $H_2O_2$.

Where a reduction product of $H_2O_2$ is desired and the cathode is a carbon electrode, it is particularly preferable to employ a potential difference E which is at least 0.80 V and preferably at least 0.90 V.

In some embodiments of the invention the anode and cathode are both platinum electrodes and the potential difference E is in the range $0.1 \leq E \leq 1.4$ V, preferably $0.1 \leq E < 1.23$ V, and particularly preferably $0.2 \leq E < 1.23$ V. In such embodiments, the reduction product may typically be $H_2O$.

In some embodiments of the invention the anode and cathode are both platinum electrodes and the potential difference E is $0.2 \pm 0.1$ V. In such embodiments, the reduction product is $H_2O$.

In some embodiments of the invention the anode is a platinum electrode and the cathode is a carbon electrode, and the potential difference E is in the range $0.1 \leq E \leq 1.4$ V, preferably $0.1 \leq E < 1.23$ V, preferably $0.2 \leq E < 1.23$ V. In such embodiments, the reduction product may typically be $H_2O_2$.

In some embodiments of the invention the anode is a platinum electrode and the cathode is a carbon electrode, and the potential difference E is $0.72 \pm 0.1$ V. In such embodiments, the reduction product may typically be $H_2O_2$.

In some embodiments of the invention the anode is a carbon electrode and the cathode is a platinum electrode, and the potential difference E is in the range $0.1 \leq E \leq 1.4$ V, preferably $0.1 \leq E < 1.23$ V, particularly preferably $0.2 \leq E < 1.23$ V. In such embodiments, the reduction product may typically be $H_2O$.

In some embodiments of the invention the anode is a carbon electrode and the cathode is a platinum electrode, and the potential difference E is $0.2 \pm 0.1$ V. In such embodiments, the reduction product is $H_2O$.

Any of the other preferred ranges or values for the potential difference E discussed elsewhere herein may self-evidently be applied to such embodiments.

The electrical current per $cm^2$ will be very low at the voltages employed in the methods of the invention and therefore the electrodes should have a high surface area in order to optimise the absolute current and hence to achieve optimal levels of electroosmotic transport. Preferably the surface area should be at least 100 $m^2$ per gram of electrode material, preferably at least 200 $m^2$ per gram, at least 300 $m^2$ per gram, at least 500 $m^2$ per gram, at least 800 $m^2$ per gram, at least 1000 $m^2$ per gram, at least 1500 $m^2$ per gram, at least 2000 $m^2$ per gram or at least 2500 $m^2$ per gram. In certain embodiments the surface area is from 100 to 2500 $m^2$ per gram, e.g. from 200 to 200 $m^2$ per gram, from 300 to 1500 $m^2$ per gram, or from 300 to 800 $m^2$ per gram. Porous and microporous materials have high surface areas and therefore in preferred embodiments the electrodes are porous, preferably microporous. A microporous material is a material having pores of average diameter 2 nm or less, preferably 1 nm or less. Typically the pores in the electrodes will be 500 nm or less in size. For example, the pore size may be 0.1 to 200 nm, 2 to 200 nm or 0.1 to 2 nm. It is also desirable that the electrode material should provide good electrical contact with the electroosmotic membrane in order to avoid unproductive voltage losses. For these reasons, it is preferable to use activated carbon as the material for both the anode and cathode. Activated carbon has a very high degree of porosity, leading typically to a surface area of over 3000 $m^2$ per gram of material, and provides excellent electrical contact with the membrane. Thus, in preferred embodiments of the invention, the anode and cathode are both activated carbon electrodes. Such electrodes may be employed together with any of the potential difference ranges described elsewhere herein.

In order to minimise voltage losses, and thereby enhance the electroosmotic pressure and electroosmotic flow, the cathode and anode are preferably close to the membrane, and particularly preferably in close contact with the membrane. Preferably, therefore, the cathode and anode are in the form of layers with the electroosmotic membrane sandwiched between the cathode layer and the anode layer. The cathode and anode layers in such embodiments are coated onto or laminated onto the membrane. In such embodiments the cathode and anode should be porous (e.g. microporous) in order to permit fluid to be pumped through the membrane.

Where the cathode and anode layers are coated onto the membrane they may for example be spray-coated onto the membrane, dip-coated onto the membrane, or coated onto the membrane by conductive printing.

Where the cathode and anode layers are laminated onto the membrane they are typically in the form of layers which are prepared separately before being attached to the membrane, e.g. by means of an adhesive. In a preferred variant, the cathode and anode layers each comprise a conductive fabric having a coating of electrode material (e.g. activated carbon). The conductive fabric may comprise a plurality of conductive fibres, filaments, or wires, which may be non-woven or interwoven (e.g. to form a mesh or grid), or may be a conductive sheet such as a planar graphite or graphene sheet. The conductive fibres could be metal wires; metal fibres; metal oxide fibres; carbon fibres; graphene; conductive polymers, such doped polyaniline or poly(3,4-ethylenedioxythiophene) (PEDOT); or non-conductive yarns (such as cotton) coated with a conductive layer, for example a layer of metal, metal oxide, carbon, or any suitable conductive substance. For example, the conductive fabric may comprise a plurality of conductive fibres of silver-coated polyester, or steel yarn. Where the conductive fabric comprises conductive fibres, filaments or wires, it optionally also comprises non-conductive fibres. Where non-conductive fibres are present, these may preferably be present in an amount of 1 to 99%, preferably 30 to 70% or 40 to 60% of the overall fabric. Where the cathode and anode layers comprise a conductive fabric, the material of the conductive fabric should be a different material to the electrode material.

If activated carbon is used as the electrode material for the anode and/or the cathode, this is typically in the form of a carbon paste comprising activated carbon particles, a pasting liquid, and optionally carbon black particles. The pasting liquid should be chemically and electrochemically inert, should have high viscosity and low volatility, and should be insoluble or only sparingly soluble in aqueous media. The pasting liquid serves the function of mechanically linking the carbon particles together. Suitable pasting liquids are well known to those skilled in the art and are described in Svancara et al., Electroanalysis 2009, 21, no. 1, pp. 7-8, the entire contents of which are hereby incorporated by reference, and in particular at section 2.3 thereof and references cited therein. Among the most frequently used pasting liquids are mineral oils, aliphatic and aromatic hydrocarbons, silicone oils and greases, ionic liquids, phenanthrene, and paraffin wax, all of which may suitably be employed in the present invention. Pasting liquids may also be referred to as "binders" but the term "pasting liquid" is employed herein to avoid any potential confusion with the binder which is employed for laminating the cathode and anode layers onto the membrane. Typically, the pasting liquid will be present at an amount of 0.1 to 50% wt. of the electrode material, preferably 2 to 30% wt., or alternatively in an amount of 0.5 to 1 mL of binder per 1 g of carbon (including carbon black where present). Where carbon black is present the ratio of activated carbon to carbon black (on a weight basis) is typically from 2:1 to 10:1, preferably 3:1 to 10:1, 4:1 to 10:1, 5:1 to 10:1, 6:1 to 10:1, 7:1 to 10:1, 8:1 to 10:1 or 9:1 to 10:1. In a preferred embodiment the carbon paste may further be doped with platinum particles. For example the carbon paste may comprise platinum particles in a small amount, such as ~0.1 to 1 mg per $cm^2$ of the electrode, preferably 0.1 to 0.6 mg per $cm^2$ or 0.2 to 0.4 mg per $cm^2$. The presence of platinum particles as a dopant is particularly preferred in combination with the presence of carbon black. The presence of platinum particles as a dopant in a carbon electrode, particularly where carbon black is present, has been found to promote the 4-electron reduction of $O_2$ to $H_2O$, as described above.

When used as an electrode material, activated carbon may be coated directly onto the electroosmotic membrane or coated onto a conductive fabric as described above. Typically, the activated carbon is applied to the membrane or fabric in a dry thickness of from 10 to 500 microns.

In an alternative embodiment, the activated carbon electrode material may be in the form of an activated carbon cloth. Examples of such cloths which are suitable for use in the present invention are those available from the Chemviron company (Feluy, Belgium) under the trade names Zorflex® and Flexzorb®. Activated carbon cloths are flexible textiles comprising, consisting essentially of, or consisting of, woven fibres of activated carbon.

The cathode and anode layers may be laminated onto the membrane using a binder, such as standard porous glue or electrically conductive glue. The binder is preferably less than 200 microns in thickness in order to minimise any voltage loss.

Electroosmotic membranes are known to those skilled in the art and may be employed in the methods of the present invention. The membrane may be a textile. The membrane may be a layered structure made up of a plurality of layers. The electroosmotic membrane may be any structure, such as a fabric, suitable for pumping fluid by electroosmotic transport. Typically the membrane is a polymer membrane.

In certain preferred embodiments of the invention, the membrane may be an asymmetric electroosmotic membrane. In an asymmetric electroosmotic membrane, the electroosmotic flow through the membrane when charge is transferred in one direction is greater than the electroosmotic flow when the same amount of charge is transferred in the other direction. This ensures that a net electroosmotic flow of fluid is achieved even when the net charge transfer through the membrane is zero (for example in the case of certain AC current/voltage applications). The charge flow in each direction can then be controlled, for example by using a constant current or by automatic counting of charges and adjustment of the length of periods of current/voltage application. Typically, an asymmetric electroosmotic membrane comprises a plurality of layers, in which adjacent layers differ in one or more of pore size, surface charge and/or ion conductivity so that fluid transport in one direction through the membrane is favoured.

Suitable asymmetric electroosmotic membranes include those described in International Patent Application Publication no. WO 2015/173359, the entire contents of which are incorporated herein by reference. Thus in certain embodiments of the invention the membrane is a porous membrane comprising first and second opposite surfaces and a net fluid flow direction extending in the porous membrane between said opposite surfaces, wherein when a given amount of charge flows through the porous membrane from the first to the second opposite surface more electroosmotic transport of the fluid will occur than when the same amount of charge flows through the porous membrane from the second to the first, opposite surface.

Where the membrane is an asymmetric electroosmotic membrane, it may be a porous membrane comprising a (first) porous layer having first and second opposite surfaces and a net fluid flow direction extending in the porous layer between said opposite surfaces, the (first) porous layer having a first region extending in the net fluid flow direction, and a second region laterally offset from the first region with respect to the net flow direction and extending in the net fluid flow direction, wherein, when a given amount of charge flows through the porous membrane in a first direction, the ratio of the amount of charge flowing through the first region compared to the second region is greater than when the same amount of charge flows through the porous membrane in a second, opposite direction. The first direction may be the net fluid flow direction. Charge may flow in the first direction when a first voltage bias is applied across the membrane and may flow in the second, opposite direction when a second, opposite voltage bias is applied.

Alternatively, the asymmetric electroosmotic membrane may be a layered structure comprising a first layer, wherein the first layer is made from an ion perm selective material having openings therein that permit the fluid to flow therethrough, and wherein the openings in the first layer that permit the fluid to flow therethrough create a porosity of less than 10%; and a second layer, wherein the second layer is an electroosmotic layer, wherein the layered structure has a net fluid flow direction that extends through the first layer and the second layer, wherein the layered structure has a region that permits fluid to flow in a direction that is non-parallel to a net fluid flow direction, and wherein the region is located between the first layer and the surface of the second layer that is furthest from the first layer. Such membranes are described in further detail in United Kingdom Patent Application no. 1702542.0, the entire contents of which are incorporated herein by reference.

In embodiments of the invention where an asymmetric membrane is employed, the method of the invention may comprise the steps of causing charge flow across the porous membrane in a first direction by applying a voltage bias across the membrane, and causing charge flow across the porous membrane in a second direction opposite to the first direction by applying an opposite voltage bias across the membrane, and wherein, when a given amount of charge flows through the porous membrane in a first direction, the ratio of the amount of charge flowing through the first region compared to the second region is greater than when the same amount of charge flows through the porous membrane in a second, opposite direction. The method may be such that, in a given amount of time, there is no net flow of charge across the membrane. Alternatively, there may be small net flow of charge over time. The small net flow of charge may result from current flow difference of 10% or less, 5% or less, or 1% or less of the current during each positive or negative pulse. The magnitude, duration and current of the opposite pulses applied across the membrane may be different. However, the signal may be controlled such that the net flow of charge over a given amount of time is zero, or near zero.

Where an asymmetric membrane is employed, the potential difference may be applied in a potentiostatic or "charge counting" mode, with the voltage (magnitude or bias) or length of voltage pulses being automatically adjusted to assure equal charge transfer in both directions.

In order to facilitate transport of fluid through the membrane, the electroosmotic membrane and the electrodes should be porous. The pore size may be selected according to the desired degree of liquid flow: larger pores lead to higher liquid flow and smaller pores lead to lower liquid flow. Typically, however, the pores in the electroosmotic membrane and the electrodes will be 500 nm or less in size. For example, the pore size may be 0.1 to 200 nm, 2 to 200 nm or 0.1 to 2 nm. The degree of liquid transport desired, and the pore size, may be selected by the skilled person having regard to the intended application of the method of the invention. "Pore size" refers to the width of the pores in the plane of the electroosmotic membrane and/or electrode layer (the pore size is the diameter in the case of pores with a circular cross section). The pore size may be measured by the well-known bubble point test which is described in American Society for Testing and Materials Standard (ASMT) Method F316. The material of the membrane may penetrate the pores of the anode and/or cathode.

In order to facilitate liquid transport through the membrane and electrodes, the pore walls in the anode, cathode and/or membrane may be hydrophobic. The pore walls in the anode, cathode and/or membrane may comprise ionic groups to carry the current, e.g. sulfonic acid groups.

The anode and/or the cathode may be coated with a capacitive coating. Such a coating, where present, is preferably located such that the anode or, respectively, the cathode, is located between the capacitive coating and the electroosmotic membrane.

In certain embodiments, an additional porous fabric layer may be located adjacent to the anode layer and/or the cathode layer such that the anode or cathode layer is situated between said further fabric layer and the electroosmotic membrane. In certain embodiments the additional porous fabric layer may be a layer of a garment such as a coat, biohazard suit, ski jacket or other item of clothing in which it is desirable to remove moisture (e.g. sweat) away from the interior to the exterior, in order to transport moisture away from the skin of the wearer. For example, the anode layer may be located adjacent to a porous fabric layer which is an inner layer of a garment and/or the cathode layer may be located adjacent to a porous fabric layer which is an outer layer of a garment. When a positive voltage is applied across the membrane, electroosmotic transport of fluid from the interior to the exterior of the garment will be the result.

An illustrative embodiment of such a configuration is shown in exploded view in FIG. 5, in which electroosmotic membrane 501 is sandwiched between anode layer 502 and cathode layer 503. Anode layer 502 and cathode layer 503 each comprise a conducting fabric layer 502a, 503a coated with an activated carbon electrode material 502b, 503b such that the electrode material is in contact with the electroosmotic membrane. The anode layer 502 and cathode layer 503 are each laminated onto the membrane via thin layers of adhesive 504, 505. Further adhesive layers 506, 507 laminate the anode and cathode layers to additional porous fabric layers 508 (an inner layer) and 509 (an outer layer).

In certain embodiments of the invention the anode layer and/or the cathode layer may themselves form layers of a garment. In an embodiment the anode layer may form an inner layer of a garment. In an embodiment the cathode layer may form an outer layer of a garment. In an embodiment the anode layer may form an inner layer of a garment and the cathode layer may form an outer layer of the garment. In all such embodiments it is preferred that the anode and cathode layers comprise activated carbon coated onto a conductive fabric, as discussed in further detail above, or that they are activated carbon cloths such as Zorflex® or Flexzorb®.

Example 1

A test cell was constructed for measuring the current and electroosmotic (EO) flow across a membrane. A schematic of this cell is shown in FIG. 1. A membrane 101 was arranged between two electrodes 102, 103 and the electrodes were connected, respectively, to a voltage source 104 and to ground ("GND") 105 via resistor 106 typically having a resistance of 2.2Ω or 47Ω. The electrodes were also connected, respectively, to separate analogue inputs 107a, 107b (respectively also labeled AIN0 and AIN1) of a LabJack® signal controller/datalogger 107 which was itself also grounded. Input AIN0 107a was set to a voltage $V_R$ and input AIN1 107b was set to a voltage $V_S$ such that the voltage applied across the membrane $V_{memb}$ was equal to $V_S$ minus $V_R$. Input AIN0 107a also measured the current through the membrane via the resistor 106 while input AIN1 107b also measured the voltage across the membrane (minus any voltage drop in the resistor). As long as the resistance of the membrane is much higher than the resistance of the resistor, the voltage measured by AIN1 should be close to the voltage applied by the voltage controller 104. (If the resistance of the membrane is not significantly higher than the resistance of the resistor, the voltage drop across the resistor may become significant and affect the measurements).

The membrane 101 was arranged in a horizontal orientation and a water head of constant 5 mm depth was maintained on top. The "positive" or "forward" direction of EO flow across the membrane was defined as being parallel to gravity, i.e. "down" through the membrane.

A flow test was performed in which a voltage of 0.5 V was applied for about 20 minutes, reversed in polarity to −0.5 V for about 20 minutes, and switched off for about 20 minutes, before repeating the cycle six further times. The electrode material was Zorflex®, which comprises activated carbon coated onto a conductive cloth. Oxygen was electrogenerated at the anode and reduced at the cathode. As the applied voltage was 0.5 V on the "forward" cycles, the cathode reaction involved reduction of oxygen to water.

The current results are shown in FIG. 2 (in which the x-axis is demarcated in multiples of 250 ms) and the flow results are shown in Table 1 below:

TABLE 1

| | Net EO flow (L/m2/h) |
|---|---|
| 0.5 V | 3.3 |
| (−)90.5 V | −1.2 |
| off | |
| 0.5 V | 3.4 |
| (−)0.5 V | −1.3 |
| off | |
| 0.5 V | 4.7 |
| (−)0.5 V | −0.2 |
| off | |
| 0.5 V | 3.8 |
| (−)0.5 V | −1.7 |
| off | |
| 0.5 V | 3.3 |
| (−)0.5 V | −1.7 |
| off | |
| 0.5 V | 3.6 |
| (−)0.5 V | −1.7 |
| off | |
| 0.5 V | 3.2 |
| (−)0.5 V | −1.8 |
| off | |

Thus the average net "forward" electroosmotic flow for a voltage of +0.5 V was approximately 3.6 litres per m² per hour.

Example 2

The same procedure as in Example 1 was followed but this time using, as electrodes, a carbon fleece coated with activated and conductive carbon particles and a binder material. The pattern of positive voltage, negative voltage, and "off" time was followed as described in Example 1 except that a total of five cycles were performed.

The current results are shown in FIG. 3 and the voltage results in Table 2 below:

TABLE 2

| | Net EO flow (L/m2/h) |
|---|---|
| 0.5 V | 0.7 |
| (−)0.5 V | −0.8 |
| off | |
| 0.5 V | 1.1 |
| (−)0.5 V | −0.7 |
| off | |
| 0.5 V | 1.0 |
| (−)0.5 V | −0.7 |
| off | |
| 0.5 V | 1.1 |
| (−)0.5 V | −0.7 |
| off | |
| 0.5 V | 1.1 |
| (−)0.5 V | −0.6 |
| off | |

Thus the average net "forward" EO flow for a voltage of +0.5 V was approximately 1.0 litres per m² per hour.

Example 3

Using a Sweating Agile Mannequin (SAM) at the Swiss Federal Laboratories for Materials Science and Technology (EMPA), a ski jacket having two A4-sized EO panels on the back was tested for EO transport under simulated sweating conditions. The EO panels consisted of carbon-coated conductive fabric either side of an EO membrane and constituted the entire thickness of the jacket in the regions where they were present. The SAM was configured to generate a sweating rate equivalent to 400 g per person per hour at an outside temperature of −5° C. for 90 minutes. The SAM was clothed with a Venosan® shirt and the ski jacket (comprising an inner (first) layer, a mid layer, and an outer ("jacket") layer) was placed over this. The EO panels were controlled and measured using a circuit as shown in FIG. 1. The electrodes and membrane were configured such that the "forward" direction of EO transport corresponded to movement of fluid in a direction away from the mannequin, i.e. from the inner to the outer layers of the ski jacket. Moisture evaporation from each layer of the fabric was measured.

A constant DC voltage of 0.5 V was applied. Gravimetric measurements were performed to determine the level of evaporation of moisture and compared to a reference measurement in which the same sweating conditions were employed but no voltage was applied. Evaporation takes place predominantly at the outer surface of the ski jacket, therefore should be improved by electroosmotic transport across the membrane panels.

The results are shown in FIG. 4. These showed that significantly less moisture accumulated in the base layer of the jacket when a nonzero voltage was applied to the membrane. The total evaporation for the entire clothing system was significantly bigger with the nonzero voltage applied. (In FIG. 4, in each of the "Venosan shirt", "First layer", "Mid Layer" and "Jacket" bars, a lower weight signifies more evaporation or transport of fluid away from the respective layers. The "Evaporated/transported" bars are higher in weight if more fluid has been evaporated or transported away. The total ("summe") bars account for the total weight of layers plus fluid (including all evaporated or transported fluid). In each case the left-hand bar relates to the "off" condition, i.e. no voltage applied, and the right-hand bar relates to the "on" condition, i.e. non-zero voltage applied.)

Example 4

A further test was conducted employing the same procedure and electrodes as described in Example 2 (i.e. electrodes consisting of a carbon fleece coated with activated and conductive carbon particles and a binder material). However, in this case the applied forwards voltage was 1.0 V, applied for 10 seconds, and the reverse voltage was −0.5 V, applied for 20 seconds, followed by a 60-minute "off" period where no voltage was applied. This cycle was performed 9 times in total and the EO flow was measured. The average net forwards EO flow during the 9 "on" periods (i.e. the periods where the +1.0 V voltage was applied) was 5.0 litres per $m^2$ per hour.

The invention claimed is:

1. A method of pumping an aqueous fluid through an electroosmotic membrane situated between a cathode and an anode, the method comprising oxidizing water to $O_2$ at the anode and reducing $O_2$ at the cathode; wherein a potential difference E between the cathode and the anode is 1.4 V or less, wherein the cathode and anode are each in the form of a porous layer, each layer being coated or laminated onto the electroosmotic membrane such that the electroosmotic membrane is sandwiched between the cathode layer and the anode layer.

2. The method of claim 1, wherein the potential difference E is less than 1.23 V.

3. The method of claim 1, wherein the potential difference is in the range $0.1 \, V \leq E < 1.23 \, V$.

4. The method of claim 1, wherein the potential difference is in the range $0 \, V < E < 0.52 \, V$.

5. The method of claim 1, wherein the potential difference is in the range $0.6 \, V \leq E < 1.23 \, V$.

6. The method of claim 1, wherein the potential difference is applied as a DC voltage.

7. The method of claim 6, wherein the DC voltage is an interrupted DC voltage comprising a first time period during which a potential difference is applied, a second time period during which the potential difference is zero, and a third time period during which a potential difference is applied.

8. The method of claim 7, wherein the second time period differs from the first and third time periods.

9. The method of claim 7, wherein each of the first, second and third time periods is independently one of 1 second to 30 minutes in duration, 1 second to 20 minutes, 1 second to 10 minutes, 1 second to 5 minutes, or 1 second to 200 seconds.

10. The method of claim 1, wherein the potential difference is applied as an AC voltage.

11. The method of claim 1, wherein the anode and cathode comprise the same electrode material as each other.

12. The method of claim 1, wherein the anode and cathode comprise different electrode materials to one another.

13. The method of claim 1, wherein the cathode comprises an electrode material which catalyzes the reduction of $O_2$ to $H_2O$.

14. The method of claim 1, wherein the cathode comprises a non-catalytic electrode material.

15. The method of claim 1, wherein the cathode comprises a noble metal as electrode material, the metal being selected from the group consisting of platinum, palladium, nickel, ruthenium, rhodium, osmium, iridium, gold, copper, and rhenium, and alloys thereof.

16. The method of claim 1, wherein the cathode comprises a carbon electrode material.

17. The method of claim 16, wherein the cathode comprises activated carbon as an electrode material.

18. The method of claim 1, wherein the cathode and anode layers each comprise a conductive fabric having a coating of electrode material.

19. The method of claim 1, wherein the anode comprises activated carbon as an electrode material.

20. The method of claim 1, wherein the cathode and anode each have a surface area of at least 300 $m^2$ per gram of electrode material.

* * * * *